United States Patent
Kihara et al.

(10) Patent No.: US 7,582,381 B2
(45) Date of Patent: Sep. 1, 2009

(54) ALKALINE STORAGE CELL AND HYDROGEN STORAGE ALLOY FOR NEGATIVE ELECTRODE OF ALKALINE STORAGE CELL

(75) Inventors: Masaru Kihara, Takasaki (JP); Takahiro Endo, Takasaki (JP); Tatsuya Aizawa, Takasaki (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 290 days.

(21) Appl. No.: 11/523,084

(22) Filed: Sep. 19, 2006

(65) Prior Publication Data

US 2007/0065721 A1   Mar. 22, 2007

(30) Foreign Application Priority Data

Sep. 20, 2005   (JP)   ............... 2005-271940

(51) Int. Cl.
*H01M 4/58* (2006.01)
*H01M 4/00* (2006.01)
*H01M 4/48* (2006.01)

(52) U.S. Cl. ................. 429/218.2; 429/223; 429/231.6; 420/900

(58) Field of Classification Search .............. 429/218.2, 429/223, 231.6; 420/900
See application file for complete search history.

(56) References Cited

U.S. PATENT DOCUMENTS

2004/0209166 A1* 10/2004 Kihara .................... 429/218.2

FOREIGN PATENT DOCUMENTS

JP        2002-164045 A      6/2002

* cited by examiner

*Primary Examiner*—Patrick Ryan
*Assistant Examiner*—Muhammad Siddiquee
(74) *Attorney, Agent, or Firm*—Westerman, Hattori, Daniels & Adrian, LLP.

(57) ABSTRACT

An alkaline storage cell has a positive electrode, a negative electrode containing a hydrogen storage alloy, and an alkaline electrolyte. The hydrogen storage alloy has a composition expressed by a general expression: $Ln_{1-\alpha}Mg_\alpha Ni_{\beta-\gamma-\delta}T_\gamma Al_\delta$, where Ln represents at least one element chosen from a group consisting of La, Ce, etc., T represents at least one element chosen from a group consisting of V, Nb, etc., and subscripts $\alpha$, $\beta$, $\gamma$ and $\delta$ represent numerical values which satisfy $0.05<\alpha<0.12$, $3.40\leq\beta\leq3.70$, $0.01\leq\gamma\leq0.15$ and $0.15\leq\delta\leq0.35$.

14 Claims, 2 Drawing Sheets

ALKALINE STORAGE CELL AND HYDROGEN STORAGE ALLOY FOR NEGATIVE ELECTRODE OF ALKALINE STORAGE CELL

BACKGROUND OF THE INVENTION

1. Field of the Invention

This invention relates to an alkaline storage cell and a hydrogen storage alloy for the negative electrode of the alkaline storage cell.

2. Description of the Related Art

There is a great demand for the alkaline storage cell using a hydrogen storage alloy for the negative electrode, for consumer use, because of its characteristics such that it-has a high capacity and that it is cleaner compared with cells using lead or cadmium.

For this type of alkaline storage cell, $AB_5$-type ($CaCu_5$-type) hydrogen storage alloy such as $LaNi_5$ is generally used. However, the discharge capacity of the cell using this type of alloy already exceeds 80% of the theoretical capacity, so that the possibility of further enhancing the capacity is limited.

Thus, in order to enhance the capacity, the development of an alkaline storage cell using rare earth-Mg—Ni hydrogen storage alloy obtained by replacing the rare-earth elements in the $AB_5$-type hydrogen storage alloy partly with Mg has been being advanced. While this type of hydrogen storage alloy can store a large amount of hydrogen, it has problems that it does not easily release the hydrogen stored, and that the corrosion resistance to the alkaline electrolyte is low. Due to these problems, the alkaline storage cell using rare earth-Mg—Ni hydrogen storage alloy for the negative electrode has problems that the discharge characteristic is not good and that the cycle life is short.

In this connection, Japanese Unexamined Patent Publication No. 2002-164045 discloses a rare earth-Mg—Ni hydrogen storage alloy of composition expressed by the following general expression and conditional expression:

$$(R_{1-a-b}La_aCe_b)_{1-c}Mg_cNi_{Z-X-Y-d-e}Mn_XAl_YCo_dM_e$$

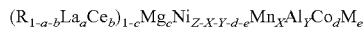

where R represents at least one element chosen from a group consisting of Ca and the rare-earth elements including Y (except for La and Ce), M represents at least one element chosen from a group consisting of Fe, Ga, Zn, Sn, Cu, Si, B, Ti, Zr, Nb, W, Mo, V, Cr, Ta, Li, P and S, and atom ratios a, b, c, d, e, f, X, Y and Z are defined as $0<a\leq0.45$, $0\leq b\leq0.2$, $0.1\leq c\leq0.24$, $0\leq X\leq0.1$, $0.02\leq Y\leq0.2$, $0\leq d\leq0.5$, $0\leq e\leq0.1$, $3.2\leq Z\leq3.8$ and $0.2\leq f\leq0.29$.

Regarding this hydrogen storage alloy, it is thought that when the relationship $c=(-0.025/a)+f$ is satisfied in the general expression, hydrogen is easily released, which leads to an improvement of the discharge characteristic of the alkaline storage cell. Further, it is thought that due to this relationship, precipitation of undesired crystal phases except for $Ce_2Ni_7$ structure, $CeNi_3$ structure and structures similar to these is suppressed and a decrease in the amount of hydrogen stored is prevented, which leads to an improvement of the cycle-life characteristic of the alkaline storage cell.

Further, in this hydrogen storage alloy, by setting Y indicating the proportion of Al to be greater than or equal to 0.02 in the general expression, the oxidation of the alloy is suppressed, while in order to suppress the precipitation of undesired crystal phases, Y is set to be less than or equal to 0.2.

However, also the rare earth-Mg—Ni hydrogen storage alloy disclosed in Japanese Unexamined Patent Publication No. 2002-164045 is not sufficient in the corrosion resistance to the alkaline electrolyte. Thus, an improvement of the cycle characteristic of the alkaline storage cell using rare earth-Mg—Ni hydrogen storage alloy is desired.

SUMMARY OF THE INVENTION

The primary object of this invention is to provide a high-capacity alkaline storage cell which contains a rare earth-Mg—Ni hydrogen storage alloy having a high corrosion resistance to the alkaline electrolyte, and which has a good cycle characteristic.

In order to achieve the above object, this invention provides an alkaline storage cell comprising a positive electrode, an alkaline electrolyte and a negative electrode containing a hydrogen storage alloy, the hydrogen storage alloy having a composition expressed by general expression (I):

(where Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts α, β, γ and δ represent numerical values which satisfy $0.05<\alpha<0.12$, $3.40\leq\beta\leq3.70$, $0.01\leq\gamma\leq0.15$ and $0.15\leq\delta\leq0.35$).

The alkaline storage cell according to this invention is suited to enhance the capacity, since the hydrogen storage alloy in the negative electrode comprises a rare earth-Mg—Ni hydrogen storage alloy.

Further, this alkaline storage cell has a good cycle characteristic. This comes from the feature that the hydrogen storage alloy contained in the negative electrode of the cell has composition expressed by general expression (I), so that the parent phase of the hydrogen storage alloy is uniform.

More specifically, in this hydrogen storage alloy, the subscript α is less than 0.12, so that the proportion of Mg is smaller compared with the conventional case. Further, the subscript β is greater than or equal to 3.4, so that the ratio of the B-site constituents to the A-site constituents (hereinafter referred to also as "B/A ratio") is greater compared with the conventional case. When the proportion of Mg is decreased and the B/A ratio is increased like this, even if segregation phases containing Mg and/or Al as a major constituent are precipitated in the parent phase of the hydrogen storage alloy, the parent phase is uniform. When the parent phase is uniform, microparticulation of the hydrogen storage alloy with the repetition of a charge/discharge cycle in the cell is prevented, so that the cell has a longer cycle life.

Desirably, the area ratio of the segregation phases in the cross section of the hydrogen storage alloy is less than or equal to 30% and the ratio (Cmin/Cave) of the minimum concentration (Cmin) of Mg to the average concentration (Cave) of Mg in the parent phase of the hydrogen storage alloy is greater than or equal to 0.4.

In this alkaline storage cell, the area ratio of the segregation phases in the cross section of the hydrogen storage alloy is less than or equal to 30%, which means that the proportion of the parent phase is larger compared with the segregation phases. In addition to this, the ratio of the minimum concentration of Mg to the average concentration of Mg in the parent phase of the hydrogen storage alloy is greater than or equal to 0.4, which means that the uniformity of the parent phase is ensured. Thus, it is ensured that this alkaline storage cell has a good cycle characteristic.

It is to be noted that, in this invention, the cross section of the hydrogen storage alloy means a polished surface obtained by polishing an average and typical region of the hydrogen storage alloy.

Further, the segregation phase indicates a local region of the hydrogen storage alloy which satisfies any of the below-mentioned relationships (i) to (iii), where the average concentration of Mg or Al means the concentration of only Mg or only Al in the entire hydrogen storage alloy, and the total average concentration of Mg and Al means the sum of the average concentration of Mg and the average concentration of Al.
(i) The concentration of Mg is greater than twice the average concentration of Mg.
(ii) The concentration of Al is greater than twice the average concentration of Al.
(iii) The total concentration of Mg and Al is greater than twice the total average concentration of Mg and Al.

Meanwhile, the parent phase indicates a region of the hydrogen storage alloy which satisfies all of the below-mentioned relationships (iv) to (vi).
(iv) The concentration of Mg is less than or equal to twice the average concentration of Mg.
(v) The concentration of Al is less than or equal to twice the average concentration of Al.
(vi) The total concentration of Mg and Al is less than or equal to twice the total average concentration of Mg and Al.

In order to achieve the above object, this invention provides a hydrogen storage alloy for a negative electrode of an alkaline storage cell, the hydrogen storage alloy having a composition expressed by general expression (I):

$Ln_{1-\alpha}Mg_{\alpha}Ni_{\beta-\gamma-\delta}T_{\gamma}Al_{\delta}$ (where Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts $\alpha$, $\beta$, $\gamma$ and $\delta$ represent numerical values which satisfy $0.05<\alpha<0.12$, $3.40\leq\beta\leq3.70$, $0.01\leq\gamma\leq0.15$ and $0.15\leq\delta\leq0.35$).

BRIEF DESCRIPTION OF THE DRAWINGS

The present invention will become more fully understood from the detailed description given hereinbelow and the accompanying drawings which are given by way of illustration only, and thus, is not limitative of the present invention, and wherein.

DETAILED DESCRIPTION

Through the studies conducted in order to achieve the above object, the inventor found out not only that segregation phases containing Mg and/or Al as a major constituent are precipitated in the parent phase in the manner depending on difference in hydrogen storage alloy composition, but also that even among the alkaline storage cells using a hydrogen storage alloy including such segregation phases, there are cells having a good cycle characteristic. Through further studies, the inventor acquired the knowledge that even when segregation phases are precipitated locally in the parent phase of a hydrogen storage alloy, if the parent phase is uniform, the hydrogen storage alloy has a high resistance to the alkaline electrolyte, and on the basis of this knowledge, reached the present invention.

Figure 1:
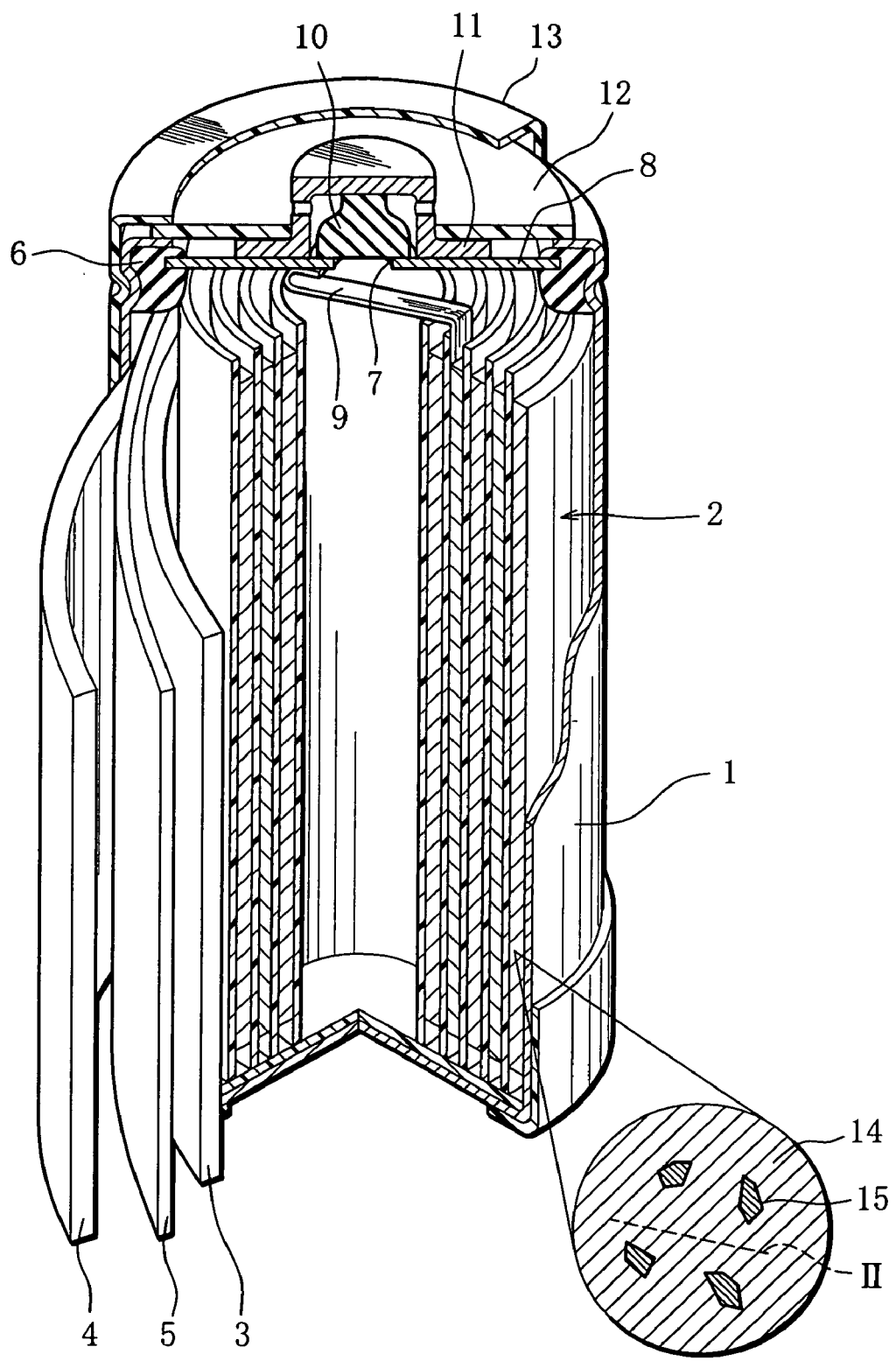
FIG. 1 is a perspective cutaway view showing a nickel-hydrogen storage cell as an embodiment of this invention, where, within the circle, the metallographic structure of a hydrogen storage alloy used in the negative electrode is schematically shown.

FIG. 1 shows a nickel-hydrogen storage cell as an embodiment of this invention.

This cell has an exterior can 1 in the form of a cylinder closed at the bottom and open at the top. The exterior can 1 contains an electrode assembly 2. The electrode assembly 2 consists of a positive electrode 3, a negative electrode 4 and a separator 5, which are rolled up with the separator 5 inserted between the positive and negative electrodes 3, 4. The outermost cylindrical part of the electrode assembly 2 is formed by the outer end part of the negative electrode 4 viewed in the direction of rolling-up, and the negative electrode 4 is electrically connected with the inner wall surface of the exterior can 1. The exterior can 1 also contains an alkaline electrolyte not shown.

For the alkaline electrolyte, a mixture of an aqueous potassium hydroxide solution and an aqueous sodium hydroxide solution, an aqueous lithium hydroxide solution or the like can be used, for example.

Within the opening at the top of the exterior can 1, a disk-shaped cover plate 8 with a gas release hole 7 in the center is arranged with a ring-shaped insulating gasket 6. The insulating gasket 6 and the cover plate 8 are fixed by crimping the rim at the open end of the exterior can 1. A positive-electrode lead 9 is arranged between the positive electrode 3 of the electrode assembly 2 and the inner surface of the cover plate 8 to connect them electrically. On the outer surface of the cover plate 8, a valve body 10 of rubber is arranged to close the gas release hole 7, and further a positive-electrode terminal 11 in the form of a cylinder with a flange is fitted to cover the valve body 10.

Further, an annular insulating plate 12 is arranged on the edge at the open end of the exterior can 1, and the positive-electrode terminal 11 projects through the insulating plate 12 outward. Reference sign 13 indicates an exterior tube. The exterior tube 13 covers the peripheral part of the insulating plate 12, the outer cylindrical surface of the exterior can 1 and the peripheral part of the bottom of the exterior can 1.

The positive electrode 3 and the negative electrode 4 will be described below more in detail.

The positive electrode 3 consists of a conductive positive-electrode substrate and a positive-electrode mixture supported by the positive-electrode substrate. For the positive-electrode substrate, a net-, sponge-, fiber- or felt-like porous metal material plated with nickel can be used, for example.

The positive-electrode mixture contains nickel hydroxide powder as a positive-electrode active material, an additive and a binding agent, where desirably, the nickel hydroxide powder is such that the average valence of nickel is greater than 2 and that the surface of each particle of nickel hydroxide powder is wholly or at least partly covered with a cobalt compound. The nickel hydroxide powder may be a solid solution containing cobalt and zinc.

For the conducting agent, powder of cobalt oxide, cobalt hydroxide, metal cobalt or the like can be used, for example. For the binding agent, carboxymethylcellulose, methylcellulose, PTFE dispersion, HPC dispersion or the like can be used, for example.

The positive electrode 3 can be made, for example, by applying a positive-electrode slurry to a positive-electrode substrate, drying the positive-electrode substrate, and then rolling and cutting the positive-electrode substrate. The positive-electrode slurry is prepared by mixing and kneading the nickel hydroxide powder, the conducting agent, the binding agent and water.

The negative electrode 4 consists of a conductive negative-electrode substrate and a negative-electrode mixture supported by the negative-electrode substrate. For the negative-electrode substrate, punching metal can be used, for example.

The negative-electrode mixture contains hydrogen storage alloy powder, a binding agent, and when necessary, a conducting agent. For the binding agent, the same substance as that used for the positive-electrode mixture can be used, where another substance such as sodium polyacrylate can be used together. For the conducting agent, carbon powder can be used, for example.

The hydrogen storage alloy powder for the negative electrode 4 comprises a rare earth-Mg—Ni hydrogen storage alloy of composition expressed by general expression (I): $Ln_{1-\alpha}Mg_{\alpha}Ni_{\beta-\gamma-\delta}T_{\gamma}Al_{\delta}$, where Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts $\alpha$, $\beta$, $\gamma$ and $\delta$ represent numerical values which satisfy $0.05<\alpha<0.12$, $3.40\leq\beta\leq3.70$, $0.01\leq\gamma\leq0.15$ and $0.15\leq\delta\leq0.35$.

Within the circle of FIG. 1, a typical and average polished surface of a hydrogen storage alloy expressed by general expression (I) is schematically shown. In this hydrogen storage alloy, segregation phases 15 are distributed in a parent phase 14. In the polished surface, the ratio of the area of the segregation phases 15 to the entire area is lower than or equal to 30%.

In each segregation phase 15, any of the below-mentioned relationships (i) to (iii) is satisfied, where the average concentration of Mg or Al means the concentration of only Mg or only Al in the entire hydrogen storage alloy, and the total average concentration of Mg and Al means the sum of the average concentration of Mg and the average concentration of Al.

(i) The concentration of Mg is greater than twice the average concentration of Mg.
(ii) The concentration of Al is greater than twice the average concentration of Al.
(iii) The total concentration of Mg and Al is greater than twice the total average concentration of Mg and Al.

Meanwhile, in the parent phase 14, all of the below-mentioned relationships (iv) to (vi) are satisfied.

(iv) The concentration of Mg is less than or equal to twice the average concentration of Mg.
(v) The concentration of Al is less than or equal to twice the average concentration of Al.
(vi) The total concentration of Mg and Al is less than or equal to twice the total average concentration of Mg and Al.

Figure 2:
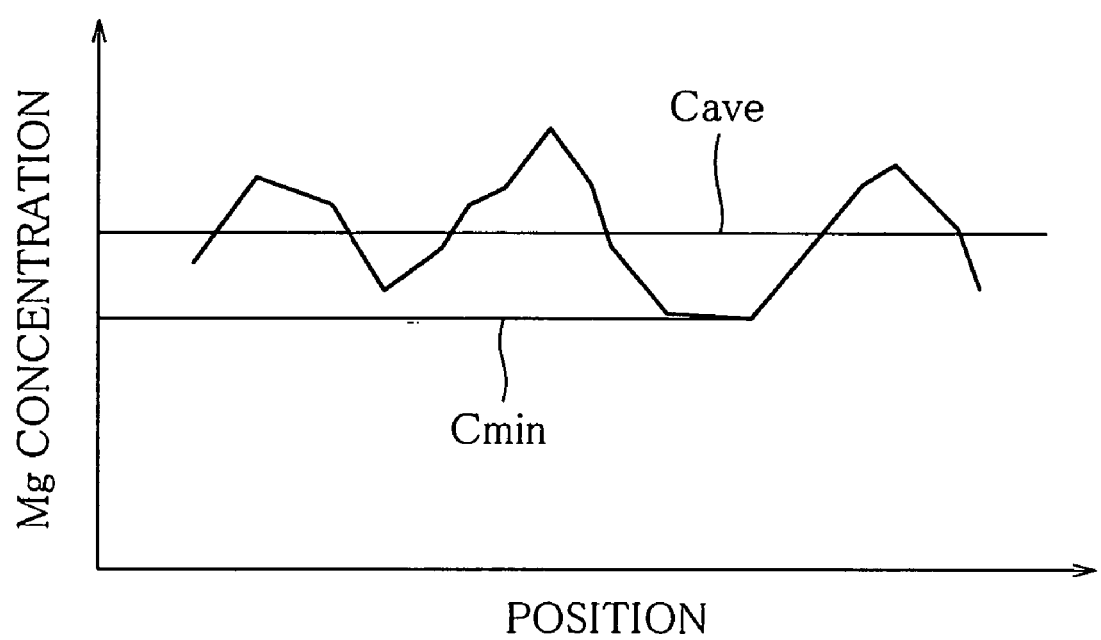
FIG. 2 is a diagram schematically showing the result of line analysis of Mg concentration along line II in FIG. 1.

FIG. 2 shows the result of line analysis of Mg concentration along line II in the circle of FIG. 1, therefore in the parent phase 14, performed using an EPMA (electron probe microanalyzer), where the ratio (Cmin/Cave) of the minimum concentration (Cmin) of Mg to the average concentration (Cave) of Mg in the parent phase 14 is greater than or equal to 0.4.

It is to be noted that in the hydrogen storage alloy of composition expressed by general expression (I), the segregation phase 15 does not necessarily exist in the parent phase 14. Needless to say, it is better that the segregation phase 15 does not exist.

The negative electrode 4 can be made, for example, by applying a negative-electrode slurry to a negative-electrode substrate, drying the negative-electrode substrate, and then rolling and cutting the negative-electrode substrate. The negative-electrode slurry is prepared by mixing and kneading the hydrogen storage alloy powder, a binding agent, water, and when necessary, a conducting agent.

The hydrogen storage alloy powder is made, for example, as follows:

First, metal materials are measured out to produce the composition expressed by general expression (I) and mixed. The mixture is melted, for example, in a high-frequency melting furnace and formed into an ingot. The ingot obtained is subjected to heat treatment, in which the ingot is heated at temperatures 900 to 1200° C. in an inert gas atmosphere for 5 to 24 hours to thereby change the crystal structure of the ingot to a superlattice structure such that $AB_5$-type structure and $AB_2$-type structure are merged, or in other words, to a $Ce_2Ni_7$-type structure or a structure similar to it. Then, the ingot is pulverized and the particles obtained are sieved to separate those of desired particle size as hydrogen storage alloy powder.

The above-described nickel-hydrogen storage cell is suited to enhance the capacity, since the hydrogen storage alloy for the negative electrode comprises a rare earth-Mg—Ni hydrogen storage alloy of composition expressed by general expression (I), which stores a large amount of hydrogen at room temperature.

Further, the above-described nickel-hydrogen storage cell has a good cycle characteristic. This comes from the feature that the hydrogen storage alloy has composition expressed by general expression (I), so that the parent phase 14 of the hydrogen storage alloy is uniform.

More specifically, in this hydrogen storage alloy, the subscript $\alpha$ is set to be less than 0.12, so that the proportion of Mg is smaller compared with the conventional case. Further, the subscript $\beta$ is set to be greater than or equal to 3.4, so that the ratio of the B-site constituents to the A-site constituents (B/A ratio) is greater compared with the conventional case. When the proportion of Mg is decreased and the B/A ratio is increased like this, the amount of segregation phases 15 produced in the parent phase 14 is suppressed and the uniformity of the parent phase 14 is ensured. When the amount of segregation phases 15 produced is suppressed and the parent phase 14 is uniform like this, microparticulation of the hydrogen storage alloy with the repetition of a charge/discharge cycle in the cell is prevented, so that the cell has a longer cycle life.

As an indicator of uniformity of the parent phase 14, the ratio (Cmin/Cave) of the minimum concentration (Cmin) of Mg to the average concentration (Cave) of Mg in the parent phase 14 can be used. In this hydrogen storage alloy, the ratio (Cmin/Cave) is greater than or equal to 0.4, which means the uniformity of the parent phase 14 is ensured. Thus, it is ensured that this nickel-hydrogen storage cell has a good cycle characteristic.

It is to be noted that when the subscript $\alpha$ is set to be greater than 0.05 in general expression (I), the hydrogen storage alloy can store a large amount of hydrogen. Thus, the subscript $\alpha$ is set to be greater than 0.05.

In general expression (I), if the subscript $\beta$ is too large, the number of hydrogen storage sites in the hydrogen storage alloy decreases, so that the hydrogen storage capacity begins to lower. Thus, the subscript β is set to be less than or equal to 3.70.

In general expression (I), the subscript γ indicates the amount of the substitute element T by which Ni is replaced. If the subscript γ is too large, the crystal structure of the hydrogen storage alloy changes. Thus, the hydrogen storage alloy begins to lose the hydrogen storage-release capacity, and the substitute element T begins to dissolve into the alkaline electrolyte and form a compound. The compound is deposited on the separator, so that the long-period preservation quality of the cell lowers. Thus, the subscript γ is set to satisfy the condition $0.01 \leq \gamma \leq 0.15$.

In general expression (I), if the subscript δ is too small, the corrosion resistance of the hydrogen storage alloy to the alkaline electrolyte lowers, so that the cycle characteristic of the cell becomes worse. In particular, when the B/A ratio is increased, the lowering in corrosion resistance of the hydrogen storage alloy becomes prominent. Meanwhile, if the subscript δ is too large, the amount of production of segregation phases 15 containing Al as a major constituent increases. Also in this case, the corrosion resistance of the hydrogen storage alloy to the alkaline electrolyte lowers, so that the cycle characteristic of the cell becomes worse. Thus, the subscript δ is set to satisfy the condition $0.15 \leq \delta \leq 0.35$.

EXAMPLES

Example 1

1. Preparation of a Negative Electrode

Metal materials were measured out to produce the composition $(La_{0.7}Y_{0.3})_{0.89}Mg_{0.11}Ni_{2.95}Mn_{0.15}Al_{0.35}$ and mixed. The mixture was melted in a high-frequency melting furnace and formed into an ingot. The ingot was heated in an argon atmosphere of temperature 1000° C. for 10 hours to thereby change the crystal structure of the ingot to a superlattice structure such that $AB_5$-type structure and $AB_2$-type structure are merged. Then, the ingot was mechanically pulverized in an inert gas atmosphere and sieved to thereby obtain rare earth-Mg—Ni hydrogen storage alloy powder having the above composition. The average particle size corresponding to weight integral 50% of the rare earth-Mg—Ni hydrogen storage alloy powder obtained, measured using a laser diffraction-scattering particle-size distribution measurement device, was 50 μm.

To 100 mass-parts of the alloy powder obtained, 0.5 mass-parts of sodium polyacrylate, 0.12 mass-parts of carboxymethylcellulose and 0.5 mass-parts (solid basis) of PTFE dispersion (medium: water, specific gravity 1.5, 60 mass % of solids), 1.0 mass-part of carbon black and 30 mass-parts of water were added, and all the materials were mixed to thereby obtain negative-electrode slurry. A nickel punching sheet coated with the negative-electrode slurry was dried, then rolled and cut to thereby obtain a negative electrode for size AA.

2. Preparation of a Positive Electrode

Nickel hydroxide powder consisting of particles wholly or partly covered with a cobalt compound was prepared. This nickel hydroxide powder was mixed with 40 mass % HPC dispersion to thereby obtain positive-electrode slurry. A nickel porous sheet packed and coated with this positive-electrode slurry was dried and then rolled and cut to thereby obtain a positive electrode.

3. Assembly of a Nickel-hydrogen Storage Cell

The negative electrode and positive electrode obtained were rolled up with a separator of polypropylene fiber non-woven fabric, thickness 0.1 mm and weight per unit area 40 g/m² inserted therebetween, to thereby form an electrode assembly. After the electrode assembly obtained was put in an exterior can and a determined fitting process was performed, an alkaline electrolyte made of a 7N aqueous potassium hydroxide solution and a 1N aqueous lithium hydroxide solution was introduced into the exterior can. By sealing the open end of the exterior can using a cover plate, etc., a sealed cylindrical nickel-hydrogen storage cell of rating capacity 2500 mAh and size AA was obtained as example 1.

Examples 2 to 6 and Comparative Examples 1 to 4

Nickel-hydrogen storage cells as examples 2 to 6 and comparative examples 1 to 4 were constructed in the same way as example 1, except that hydrogen storage alloys of composition shown in table 1 were used, respectively.

4. Evaluation of Cells and Hydrogen Storage Alloys (1) Cycle Characteristic

For each of the nickel-hydrogen storage cells constructed as examples 1 to 6 and comparative examples 1 to 4, in an environment of temperature 25° C., an initial activation process was performed, in which the cell was charged with a 0.1 It charging current for 15 hours, and then discharged with a 0.2 It discharge current up to the termination voltage 1.0V. After this initial activation process, for each cell, in an environment of temperature 25° C., the charge/discharge cycle consisting of dV-controlled charging with a 1.0 It charging current, 60 minutes' rest and discharging with a 1.0 It discharge current up to the termination voltage 0.5V was repeated 300 times. In the first and 300th cycles, the discharge capacity was measured, and the percentage of the discharge capacity in the 300th cycle relative to the discharge capacity in the first cycle was obtained. The results obtained are also shown in Table 1.

(2) Area Ratio of Segregation Phases in Hydrogen Storage Alloy

Regarding each of the hydrogen storage alloys used in examples 1 to 6 and comparative examples 1 to 4, a small piece of the hydrogen storage alloy was embedded in resin and polished. On the polished surface of the piece, element mapping using an EPMA (electron probe microanalyzer) was performed. On the basis of the Mg and Al maps obtained, the ratio of the area of regions containing one or both of Mg and Al as major constituents, i.e., the area ratio of segregation phases was obtained. The results obtained are also shown in Table 1. It is to be noted that the area of the surface on which the element mapping was performed was 200 μm×200 μm.

(3) Uniformity of Parent Phase of Hydrogen Storage Alloy

Regarding each of the hydrogen storage alloys used in examples 1 to 6 and comparative examples 1 to 4, on the basis of the results of the element mapping mentioned in (2) above, the average and minimum concentrations of each of Mg and Al in the region where neither Mg nor Al was precipitated, i.e., in the parent phase were calculated. Then, for each of Mg and Al, the ratio (Cmin/Cave) of the minimum concentration (Cmin) to the average concentration (Cave) was obtained as an indicator of uniformity of the parent phase. The results obtained are also shown in Table 1.

TABLE 1

| | Hydrogen storage alloy | | | | Cell evaluation |
|---|---|---|---|---|---|
| | Composition | Area ratio of segregation phases (%) | Cmin/Cave for Mg | Cmin/Cave for Al | Cycle characteristic (%) |
| Example 1 | $(La_{0.7}Y_{0.3})_{0.89}Mg_{0.11}Ni_{2.95}Mn_{0.15}Al_{0.35}$ | 25 | 0.45 | 0.35 | 80 |
| Example 2 | $(La_{0.7}Y_{0.3})_{0.89}Mg_{0.11}Ni_{2.95}Mn_{0.15}Al_{0.30}$ | 25 | 0.45 | 0.45 | 90 |
| Example 3 | $(La_{0.7}Y_{0.3})_{0.94}Mg_{0.10}Ni_{2.95}Mn_{0.15}Al_{0.35}$ | 21 | 0.47 | 0.37 | 89 |
| Example 4 | $(La_{0.7}Y_{0.3})_{0.94}Mg_{0.09}Ni_{2.95}Mn_{0.15}Al_{0.35}$ | 17 | 0.50 | 0.40 | 91 |
| Example 5 | $(La_{0.7}Y_{0.3})_{0.94}Mg_{0.06}Ni_{2.95}Mn_{0.15}Al_{0.30}$ | 12 | 0.56 | 0.49 | 95 |
| Example 6 | $(La_{0.7}Y_{0.3})_{0.94}Mg_{0.06}Ni_{3.15}Mn_{0.15}Al_{0.30}$ | 9 | 0.59 | 0.59 | 97 |
| Comp. ex. 1 | $(La_{0.7}Y_{0.3})_{0.80}Mg_{0.20}Ni_{2.95}Mn_{0.15}Al_{0.35}$ | 35 | 0.20 | 0.30 | 54 |
| Comp. ex. 2 | $(La_{0.7}Y_{0.3})_{0.89}Mg_{0.11}Ni_{2.80}Mn_{0.15}Al_{0.35}$ | 38 | 0.21 | 0.30 | 51 |
| Comp. ex. 3 | $(La_{0.7}Y_{0.3})_{0.89}Mg_{0.11}Ni_{2.90}Mn_{0.15}Al_{0.40}$ | 37 | 0.25 | 0.32 | 50 |
| Comp. ex. 4 | $(La_{0.7}Y_{0.3})_{0.94}Mg_{0.06}Ni_{2.75}Mn_{0.15}Al_{0.30}$ | 20 | 0.19 | 0.28 | 47 |

From Table 1, the Following are Clear:

The comparison between comparative example 1 and example 1 shows that by reducing the α value, the production of segregation phases was suppressed and the uniformity of the parent phase was improved, so that the cycle characteristic was improved to a great degree.

In example 2, by reducing also the δ value, the production of Al-derived segregation phases was suppressed and the uniformity of the parent phase was improved, so that the cycle characteristic was further improved.

As compared with example 1, in examples 3 and 4, by reducing the α value further, the production of segregation phases was further suppressed and the uniformity of the parent phase was further improved, so that the cycle characteristic was improved.

Also the comparison between example 2 and example 5 shows that by reducing the α value, the production of segregation phases was suppressed and the uniformity of the parent phase was improved. This indicates that the reduction of the α value is effective, regardless of the δ value.

The comparison between example 5 and example 6 shows that by not only reducing the α value but also increasing the β value, the production of segregation phases was suppressed and the uniformity of the parent phase was improved, so that the cycle characteristic was improved.

Meanwhile, in comparative example 2 in which the β value was low and comparative example 3 in which the δ value was relatively high, the production of segregation phases increased and the uniformity of the parent phase lowered, so that the cycle characteristic became worse.

Comparative example 4 shows that by reducing the α value to reduce the amount of Mg, the production of segregation phases can be suppressed. Meanwhile, since the β value is low and therefore the uniformity of the parent phase is low, the cycle characteristic is worse. This indicates that for the improvement of the cycle characteristic, high uniformity of the parent phase is important rather than the suppression of production of segregation phases.

The present invention is not limited to the above-described embodiment and examples but various modifications can be made. The cell can be a rectangular cell, and the mechanical structure is not limited in particular.

In the described embodiment, Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf, where if Ce is chosen for Ln, it is desirable that the atomic ratio of Ce in Ln should not exceed 0.2. This is because if the proportion of Ce exceeds 0.2, the hydrogen storage capacity of the hydrogen storage alloy lowers.

In the described embodiment, the subscript α is in the range $0.05<\alpha<0.12$, where desirably, it is in the range $0.06<\alpha<0.10$, and more desirably, in the range $0.06<\alpha\leq0.09$.

In the described embodiment, the area ratio of segregation phases is less than or equal to 30%, where desirably, it is less than or equal to 25%, and more desirably, less than or equal to 10%.

In the described embodiment, the ratio (Cmin/Cave) for Mg in the parent phase 14 is greater than or equal to 0.4. However, as an indicator of uniformity of the parent phase 14, various values can be used. For example, the ratio (Cmin/Cave) of the minimum concentration (Cmin) of Al to the average concentration (Cave) of Al in the parent phase 14 can be used, and in this case, the ratio (Cmin/Cave) for Al should be also greater than or equal to 0.4.

Finally, the alkaline storage cell according to the present invention can be applied not only to the nickel-hydrogen storage cell but also to an alkaline storage cell whose negative electrode contains hydrogen storage alloy powder.

The invention thus described, it will be obvious that the same may be varied in many ways. Such variations are not to be regarded as a departure from the sprit and scope of the invention, and all such modifications as would be obvious to one skilled in the art are intended to be included within the scope of the following claims.

What is claimed is:

1. An alkaline storage cell comprising:
   a positive electrode;
   an alkaline electrolyte; and
   a negative electrode containing a hydrogen storage alloy, the hydrogen storage alloy having a composition expressed by a general expression:

$Ln_{1-\alpha}Mg_\alpha Ni_{\beta-\gamma-\delta}T_\gamma Al_\delta$ (where Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts α, β, γ and δ represent numerical values which satisfy $0.05<\alpha<0.12$, $3.40\leq\beta\leq3.70$, $0.01\leq\gamma\leq0.15$ and $0.15\leq\delta\leq0.35$);

wherein the hydrogen storage alloy includes
a parent phase, in the parent phase a ratio (Cmin/Cave) of a minimum concentration (Cmin) of Mg to an average concentration (Cave) of Mg being greater than or equal to 0.4, and
segregation phases, an area ratio of the segregation phases in a cross section of the hydrogen storage alloy being less or equal to 30%.

2. The cell according to claim 1, wherein the area ratio of the segregation phases in the cross section of the hydrogen storage alloy is less than or equal to 25%.

3. The cell according to claim 2, wherein the area ratio of the segregation phases in the cross section of the hydrogen storage alloy is less than or equal to 10%.

4. The cell according to claim 1, wherein $\alpha$ in the expression is in a range $0.06 < \alpha < 0.10$.

5. The cell according to claim 4, wherein $\alpha$ in the expression is in a range $0.06 < \alpha \leqq 0.09$.

6. The cell according to claim 5, wherein the area ratio of the segregation phases in the cross section of the hydrogen storage alloy is less than or equal to 25%.

7. The cell according to claim 6, wherein the area ratio of the segregation phases in the cross section of the hydrogen storage alloy is less than or equal to 10%.

8. A hydrogen storage alloy for a negative electrode of an alkaline storage cell, having composition expressed by a general expression:

$$Ln_{1-\alpha}Mg_\alpha Ni_{\beta-\gamma-\delta}T_\gamma Al_\delta$$

(where Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Zn, Ga, Sn, In, Cu, Si, P and B, and subscripts $\alpha$, $\beta$, $\gamma$ and $\delta$ represent numerical values which satisfy $0.05 < \alpha < 0.12$, $3.40 \leqq \beta \leqq 3.70$, $0.01 \leqq \gamma \leqq 0.15$ and $0.15 \leqq \delta \leqq 0.35$);

wherein the hydrogen storage alloy includes
a parent phase, in the parent phase a ratio (Cmin/Cave) of a minimum concentration (Cmin) of Mg to an average concentration (Cave) of Mg being greater than or equal to 0.4, and
segregation phases, an area ratio of the segregation phases in a cross section of the hydrogen storage alloy being less than or equal to 30%.

9. The hydrogen storage alloy according to claim 8, wherein the area ratio of the segregation phases in the cross section of the hydrogen storage alloy is less than or equal to 25%.

10. The hydrogen storage alloy according to claim 9, wherein the area ratio of the segregation phases in the cross section of the hydrogen storage alloy is less than or equal to 10%.

11. The hydrogen storage alloy according to claim 8, wherein $\alpha$ in the expression is in a range $0.06 < \alpha < 0.10$.

12. The hydrogen storage alloy according to claim 11, wherein $\alpha$ in the expression is in a range $0.06 < \alpha \leqq 0.09$.

13. The hydrogen storage alloy according to claim 12, wherein the area ratio of the segregation phases in the cross section of the hydrogen storage alloy is less than or equal to 25%.

14. The hydrogen storage alloy according to claim 13, wherein the area ratio of the segregation phases in the cross section of the hydrogen storage alloy is less than or equal to 10%.

\* \* \* \* \*